United States Patent
Mulye et al.

(10) Patent No.: US 8,994,203 B2
(45) Date of Patent: Mar. 31, 2015

(54) HYDROKINETIC ENERGY CONVERSION SYSTEM

(75) Inventors: Nirmal Mulye, Kendall Park, NJ (US); Shrikrishna Sane, Mumbai (IN); Vijay Shukla, Highland Park, NJ (US); Osanan L. Barros Neto, Baraga, MI (US); Vinayak Manmadkar, Maharashtra (IN)

(73) Assignee: Nostrum Energy Pte. Ltd., Tradehub (SG)

( * ) Notice: Subject to any disclaimer, the term of this patent is extended or adjusted under 35 U.S.C. 154(b) by 752 days.

(21) Appl. No.: 12/945,460

(22) Filed: Nov. 12, 2010

(65) Prior Publication Data

US 2011/0115231 A1    May 19, 2011

Related U.S. Application Data

(60) Provisional application No. 61/281,034, filed on Nov. 12, 2009.

(51) Int. Cl.
- F03B 13/00 (2006.01)
- H02P 9/04 (2006.01)
- F03B 17/06 (2006.01)

(52) U.S. Cl.
CPC ......... *F03B 17/064* (2013.01); *F05B 2240/231* (2013.01); *F05B 2240/301* (2013.01); *F05B 2240/93* (2013.01); *F05B 2240/97* (2013.01); *F05B 2260/4022* (2013.01); *F05B 2260/506* (2013.01); *Y02E 10/28* (2013.01); *Y02E 10/38* (2013.01)
USPC ............................................ 290/54; 290/43

(58) Field of Classification Search
USPC .................... 290/54, 43, 44; 104/24; 60/325; 415/3.1; 114/102.16
See application file for complete search history.

(56) References Cited

U.S. PATENT DOCUMENTS

| | | | |
|---|---|---|---|
| 4,163,905 A | | 8/1979 | Davison |
| 4,170,738 A | * | 10/1979 | Smith ............................. 290/42 |
| 4,589,344 A | | 5/1986 | Davison |

(Continued)

FOREIGN PATENT DOCUMENTS

| | | |
|---|---|---|
| EP | 0 022 635 A1 | 1/1981 |
| FR | 862663 A | 3/1941 |

(Continued)

OTHER PUBLICATIONS

International Search Report and Written Opinion of the International Searching Authority for International Application No. PCT/US2010/056540 dated Jul. 1, 2011.

(Continued)

*Primary Examiner* — Julio Gonzalez R.
(74) *Attorney, Agent, or Firm* — Scully, Scott, Murphy & Presser, P.C.

(57) ABSTRACT

A hydrokinetic energy conversion system (HKECS) is provided, comprising design configurations suitable for efficient production of tidal or river in-stream kinetic energy into useful mechanical energy for tasks such as generating electricity or water pumping. The apparatus includes a set of blades with an airfoil cross sectional contour moving on a horizontal or vertical closed loop track, whereby the blades are propelled through the water by a net tangential lift force, rather than drag, to effectively convert the kinetic energy of flowing water to useful power.

47 Claims, 8 Drawing Sheets

(56) References Cited

U.S. PATENT DOCUMENTS

| | | | |
|---|---|---|---|
| 5,134,305 A | 7/1992 | Senehi | |
| 5,992,341 A | 11/1999 | Gerhardt | |
| 6,672,522 B2 * | 1/2004 | Lee et al. | 290/55 |
| 7,902,684 B2 * | 3/2011 | Davison et al. | 290/44 |
| 2004/0080166 A1 * | 4/2004 | Davidson | 290/55 |
| 2008/0157526 A1 * | 7/2008 | Davison et al. | 290/3 |
| 2010/0066091 A1 * | 3/2010 | Park et al. | 290/53 |
| 2012/0132117 A1 * | 5/2012 | Berm dez Miquel et al. | 114/102.15 |

FOREIGN PATENT DOCUMENTS

| | | |
|---|---|---|
| WO | WO 2005/028857 A1 | 3/2005 |
| WO | WO 2007/070935 A1 | 6/2007 |
| WO | WO 2009/052202 A1 | 4/2009 |

OTHER PUBLICATIONS

European Search Report dated Apr. 17, 2013 issued in European Patent Application No. EP 10 83 0790.1.

* cited by examiner

HYDROKINETIC ENERGY CONVERSION SYSTEM

CROSS REFERENCE TO RELATED APPLICATION

This application claims priority to U.S. Provisional Patent Application No. 61/281,034, filed Nov. 12, 2009, the entire contents of which are incorporated by reference.

FIELD OF THE INVENTION

This invention pertains generally to the capture of energy, such as the production of electrical power, from water currents or tides.

BACKGROUND OF INVENTION

The present invention relates to a novel hydrokinetic (tidal or river or canal) energy conversion system (HKECS), which exploits the use of excess energy in ocean tides or river/canal streams to generate electricity or to power mechanical loads such as water pumping.

Clean, renewable energy sources, such as solar, wind, ocean wave and tides or river streams have become particularly relevant and the subject of growing research and development as fossil fuel alternatives. Increased awareness of global climate change due to harmful greenhouse gas emissions, harmful hazardous wastes from coal and nuclear energy, as well as the desire to move away from dependency on the depleting reserves of fossil fuels makes clean renewable energy sources economically and environmentally attractive, if not imperative.

However, some of these renewable energy resources are not globally available with equal or dependable energy densities. Different geographic locations and changing climate conditions make clean energy sources inconsistent or unpredictable. Moreover, their energy densities vary substantially. For example, solar energy is about 0.15-1 $kW/m^2$ with the higher value near the equator; wind energy is about 0.2-1.0 $kW/m^2$; ocean waves are about 10-50 kW/m; and tidal flows can provide from 0.5-20 $kW/m^2$ for an annual average water stream velocity range of 1.0 to 3.5 m/s).

Tidal and river stream energy is more predictable than wind energy or solar power. Tides are driven by predictable and regular gravitational forces between the sun, moon and earth, whereas wind and solar power are governed by solar radiation and the interaction of atmosphere, ocean, topology and earth rotation, which often result in heterogeneous and unpredictable distribution. Natural river systems and man made canal systems operate on the gradient between the precipitation site and the ocean, which normally exceeds the required value to maintain the nominal flow regime and results in soil erosion. It is this excess kinetic energy that can be gainfully employed with extra side benefits, such as soil retention or recovery. For example, it is estimated that India receives about 400 million hectare-m rainfall annually, and if this occurs at an average altitude of 500 m then it possesses $2 \times 10^{19}$ J or $5.5 \times 10^9$ MWhr of energy, which is five times the total current annual electricity generation in India.

Tidal energy varies with combined solar-lunar cycles in a cyclic fashion with four cycles per day with predictable phase shifts of about 50 minutes. The magnitude of tidal energy depends upon the strength of the tide, which is determined by the changing positions of the moon and sun, the effects of the earth's rotation, and the local shape of the sea floor and coastlines. In particular, it is known that a current flowing against the swell increases the wave height, whereas the wave height is attenuated when both phenomena are in the same direction. Seasonal variations and geographic tidal location also need to be taken into account. Although tidal energy on a given site can be predicted if the local tidal streams are known, the tidal basin shape and other factors influence tidal energy and can be important design considerations. The attractive zones for tidal energy systems are in areas with fast currents where natural flows are concentrated in restricted coastal configurations, like at the entrances to bays and rivers, around rocky points and capes, between islands, and in limited or shallow water depth areas. The combination of these factors results in a complex dynamic that must be considered in locating and designing a tidal powered energy system.

River streams, especially those fed by rains and melting glaciers are also a plentiful and predictable energy resource. The magnitude of river stream energy depends upon the river's velocity and volume, the former determined by the gradient and the roughness and shape of the channel, and the latter determined by the size of the drainage basin, vegetation, climate, and permeability of the underlying rocks. The combination of these factors results in a complex dynamic that must be considered in locating and designing a river stream powered energy system.

Water has a much higher density than air (832 times), so a single tidal or river stream generator can provide significant power at low tidal or river flow velocities as compared to wind currents. Moreover, because of the smaller value of kinematic viscosity of water (almost 1:20), compared to air, small size blades (100-200 mm chord) that operate at high Reynolds numbers result in a significantly improved aero(hydro)dynamic performance in water as compared to air. A wind machine designed to operate at similar Reynolds numbers would require blades 10 times bigger in chord in order to be effective at low speeds.

Water turbine designs in the prior art are adopted from existing wind turbine technology and are naturally similar to the designs of wind turbines: propeller-type horizontal axis wind turbine ("HAWT"), or vertical axis wind turbines ("VAWT"), including Darrieus-type and helical bladed Gorlov type turbines. Conventional energy conversion devices for both tidal and wind resources have well known aerodynamic (or hydrodynamic) energy extraction limits based on a classical 1-D model, the so-called "Betz Limit" of 16/27 (59.3%), and have their peak performance, indicated by the value of coefficient of power $C_p$, at relatively high values of tip speed ratio (5-8). As such, the variation in rotor speeds will be very large and the cut-out speeds low, as limited by absolute tip speeds.

In known hydrokinetic turbine designs, the blades rotate around a fixed vertical (VAWT) or horizontal (HAWT) axis. A hub comprises symmetrical blades (for bi-directional tidal turbines) affixed thereto, which accepts the current from both sides. For a given tidal current velocity, there is a rotational speed delivering the maximum power and a free wheeling rotational speed.

Some of the problems associated with the traditional fixed axis turbine designs in water are that the mechanically complex hub is submersed and requires a minimum water depth for operation. Additionally, the difference in the relative speed of the rotor blade at the hub and tip reduces the extraction efficiency in HAWT turbines. In water, this problem is compounded by variable underwater current velocities—faster near the water's surface and slowing significantly approaching the bottom. Reversible turbines with large diameter rotors result in low-rotational-speed problems and have comparatively lower performance, higher cost, and are more complicated than non-reversible turbines. The size of these turbines can be varied only by varying the rotor diameter (as the number of blades required is 2 or 3 regardless of the size) these designs cannot be efficiently adapted to sites with varying widths and depths.

The tidal or river stream turbine design must also take into account the difficulties of a submarine environment, including long term submersion in water and strong tides or current, which are steadier and more consistent than wind forces. Additionally, the local geography under which installation, operation and maintenance are to be performed, should be considered. Machinery submerged under water must be designed to function under water, and requires proper construction, insulation, and sealing from the corrosive effects of the ocean or river water. Further, the vibration of the support structure, under the influence of tides, waves, and streams and resulting mechanical stress, wear, and tear also need to be considered. Finally, the design must be economically viable.

A water current velocity of 3 m/s is caused by a level difference of less than half a meter. The conventional arrangement of hydroelectric turbines, where the entire water stream has to be ducted into and out of the hydro turbine is not a practicable solution for an energy source with a very small head and a very large flow.

Indian Patent Application Nos.: 910/MUM/2006, 1106/MUM/2006 and 1563/MUM/2007, PCT IN2008/00878 and U.S. Pat. No. 7,709,971, relate to a novel Linear Wind Powered Electric Generator suitable for ultra low speed class 2 wind sites. These basic concepts and principles can be applied for a hydrokinetic, water powered electric generator, but must take into account current velocity, which is about 3-4 times lower, kinematic viscosity, which is 20 times lower, and density which is 800-1100 times higher than wind. Moreover, free surface, natural gradients, variable speeds due to channel depth, and current variations caused by channel cross section need to be addressed in adapting the aforementioned wind turbines for use in water flows.

SUMMARY OF THE INVENTION

The present invention introduces several novel features that effectively address the problems encountered with hydrokinetic turbine designs, i.e., turbines driven by natural water flows that are used to generate power, including producing electricity or pumping water.

Accordingly, this invention provides a linear hydrokinetic electric generator apparatus, having an essentially non-circular closed-loop track with a substantially linear segment situated normal to the direction of a water flow in a waterway, wherein the track includes at least one rail. The apparatus has at least one blade assembly adapted to move on the entire length of the track. Each blade assembly has at least one rail system connection adapted to securely connect the blade assembly to the track and at least one airfoil blade where a portion of the airfoil blade is at least partially submerged in the water flow and adapted to move linearly in response to the water flow. The blades each have a suitable airfoil cross sectional contour and pitch angle such that the net tangential component of lift and drag acting on the airfoil in response to the water flow propels the blade in the direction of motion on a linear segment of the track at a greater velocity than the velocity of the water current in the water flow. A power producing means is operatively associated with the motion of the blades on the track. The power produced therefrom may be rotary power or production of electricity. In various embodiments, the apparatus may have a rotary powered device such as a rotary electrical generator or a water pump, operatively associated with the rotary power produced by the apparatus. In another embodiment, an electrical generator is mounted on each blade assembly. In another embodiment, a linear generator produces electrical power from the motion of the blades on the track. In an embodiment this invention may employ a plurality of blade assemblies. In an embodiment, any blade assembly may include a plurality of blades.

DETAILED DESCRIPTION OF THE INVENTION

Figure 1A:
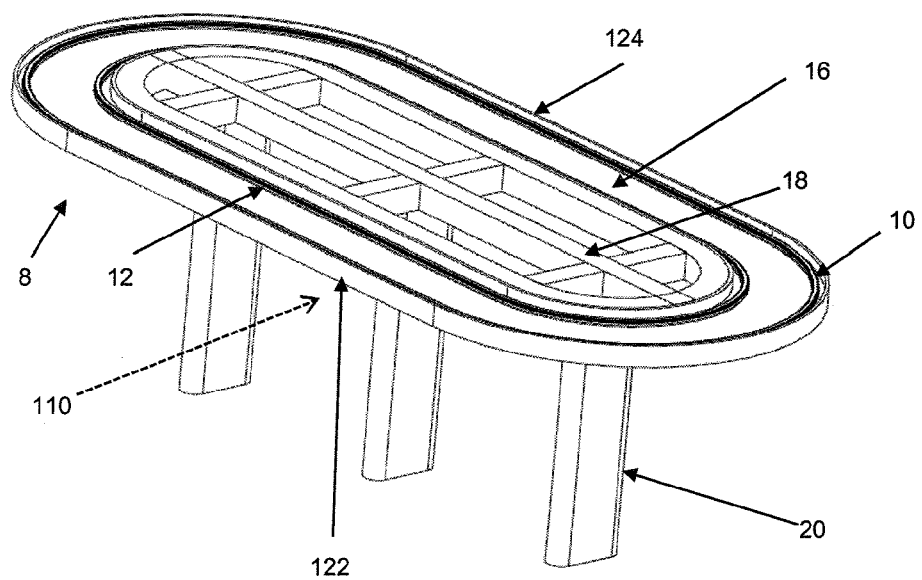
FIGS. 1a through 1d show various embodiments of a linear water-powered electric generator apparatus.

This invention provides a hydrokinetic energy conversion system (HKECS), which includes a track, and a set of blades that move on the track in response to a water flow, and power producing means. The term "hydrokinetic" refers to being powered by the flow of water. A key aspect to this invention is that the blades have a suitable airfoil shape, including a cross section, chord, camber, and aspect ratio, such that the blades have a net tangential component of lift as they are propelled along the track in the water flow. The energy produced by the movement of the blades is harnessed to generate electricity or other forms of power. Thus, the energy in a water current, which can be water in a river, canal, tidal basin, or the like, can be converted into useful power. As set forth below, this invention can be used to produce electricity or pump water, but other useful energy forms are possible that can use rotational energy from a shaft.

Accordingly, in its broadest embodiments, this invention provides a linear hydrokinetic electric generator apparatus, having an essentially non-circular closed-loop track with a substantially linear segment situated normal to the direction of a water flow in a waterway, wherein the track includes at least one rail. The apparatus has at least one blade assembly adapted to move on the entire length of the track. Each blade assembly has at least one rail system connection adapted to securely connect the blade assembly to the track and at least one airfoil blade where a portion of the airfoil blade is at least partially submerged in the water flow and adapted to move linearly in response to the water flow. The blades each have a suitable airfoil cross sectional contour and pitch angle such that the net tangential component of lift and drag acting on the airfoil in response to the water flow propels the blade in the direction of motion on a linear segment of the track at a greater velocity than the velocity of the water current in the water flow. A power producing means is operatively associated with the motion of the blades on the track. The power produced therefrom may be rotary power or production of electricity.

Thus, in this invention, power is converted from flowing water to useful power by the interaction of the water with an airfoil blade, which is propelled on a track. By the term "blade" in this invention is meant wing-like devices with an aerodynamic shape. This includes an airfoil cross section contour. In this invention, the airfoil blades are designed to interact with flowing water, rather than air. The blades of this invention are designed to interact with the flowing water in a lift-like fashion, rather than by drag. For example, a spinnaker sail, an oar for a boat, or paddle-wheel structure are propelled primarily by drag, of the pressure of the medium (air or water) current against the surface of the structure facing the current. The current in a drag-propelled structure pushes against the structure to cause propulsion. In a drag propelled structure, the current moves faster than the structure.

By contrast, in a lift-like structure, the airfoil cross sectional contour of the structure interacts with the current to produce lift due to the local current flowing over the front and back side of the moving airfoil structure and the net pressure difference from the relative current on both sides of the airfoil. Similar forces work on the airfoil of an aircraft wing as the aircraft moves through air to generate lift for an aircraft. The lifting blades of this invention therefore harness substantially more energy from a water current as compared to a drag-powered device. The lifting blades are propelled in water at about 1.5 to about 8.0 times the speed of the water current. This range is determined by the airfoil shape, size and number of such airfoils used on a given track.

Thus, in the apparatus of this invention, the net tangential component of lift substantially exceeds the tangential component of drag acting on the airfoil in response to the movement of the airfoil-shaped blade through a water current. The net tangential component of lift generated thereby propels the blade in the direction of motion on a linear segment of the track at a greater velocity than the velocity of the water current.

The blades are mounted on blade assemblies, which in turn are mounted on the track. The simplest track design in this invention is an extended closed loop shape, such as an oval, shown in 2 in FIG. 6. The track may be level or mounted in a vertical orientation. In an embodiment, the track is elevated above the water level, for example supported on pylons or supported from an overhead structure, such as a bridge. The blades are mounted on the blade assemblies with a fixed pitch angle with respect to the linear segments of the track. As used herein, the term "pitch angle" is synonymous with the angle of attack of the airfoil in the water current. The motion of the blades on the assemblies and the pitch angle of the blades with respect to the track is illustrated schematically in FIG. 7. In FIG. 7, the blades 100 are shown moving around an oval closed loop track 80 in the direction of motion 120, i.e., in a counterclockwise direction.

Figure 6:
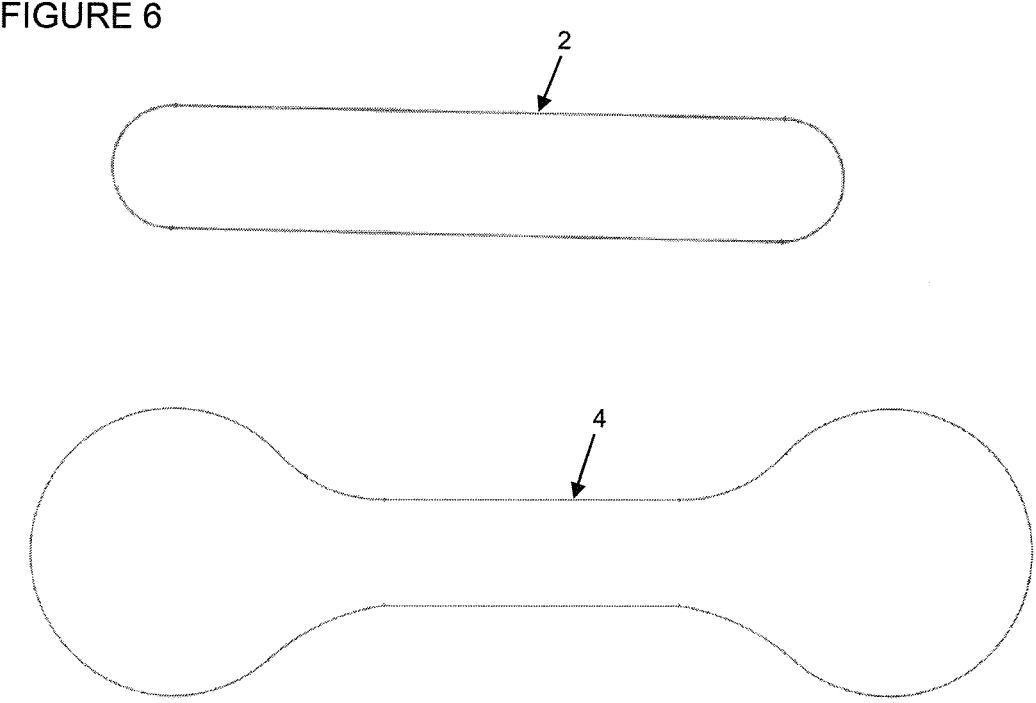
FIG. 6. shows two diagrammatic embodiments of track shape layouts when viewed from above.
Figure 7:
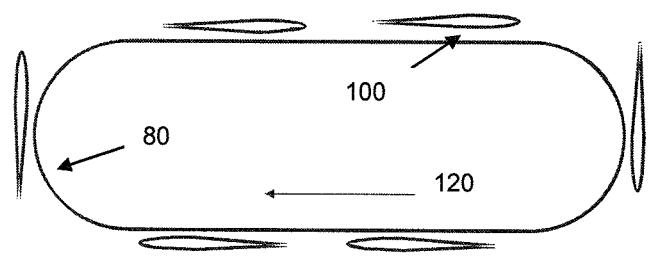
FIG. 7. shows diagrammatically the movement of blades around a closed looped track.

The closed loop track of this invention can have a variety of shapes when viewed from above, but in its simplest form, the track is an elongated and linear oval (see 2 in FIG. 6). A design consideration for this invention generally requires at least one segment of the track to be straight and situated perpendicular to a water flow. By having at least one segment perpendicular to the water flow, the exposure of the blades to the water is maximized for energy extraction from the kinetic energy in the water flow.

Other track designs are possible besides oval, and may be desirable depending the nature of the waterway. For example, a dumbbell shape, such as 4 in FIG. 6, may be advantageous in some circumstances if the speed of the blade assemblies going around the corners is desired to be slower. A track with a larger radius at the ends could reduce the centrifugal forces on the blade assembly at the corners, which would increase the cut-out speed, the speed at which the device no longer produces useful power at higher current velocities. Increasing the cut-out speed thus increases the range of velocities at which the inventive apparatus can produce useful power.

In another embodiment, the track may circumscribe an essentially oval closed loop path with a first linear segment normal to the direction of the water current on a leading segment of the track, and a second linear segment perpendicular to the water flow on a trailing segment of the track. If the blades have equal lift on both linear segments, this configuration has the advantage of theoretically increasing the Betz limit to 16/25.

The term "track," as used in this invention, refers to a rigid structure, tracing a path as discussed above. In one sense, the track provides rigidity that supports the blades against the normal forces from the flow of the water current. The tracks also include at least one load-bearing rail, which provides rigidity, supports the weight of the blade assemblies, and supports the blade assemblies against the pressure from the water flow. Such rails can be termed as load bearing. Various illustrations of track embodiments are shown in FIGS. 1a-1d.

In one embodiment, the track may have dual rails as illustrated in FIG. 1a. This illustration shows track 8 with two coplanar concentric rails, an outer rail 10 and an inner rail 12. The rails are on approximately the same plane, but may be banked in the corner regions of the track. By banking the rails, the centrifugal forces at the corners are reduced which increases the cut-out speed of the blades. The track shown in FIG. 1a circumscribes an essentially oval path with a leading linear segment 122 normal to the current flow 110, and a trailing linear segment 124. Also shown in FIG. 1a is a transverse supporting structure 18, and vertical supports 20, which support the track apparatus from below. For example, supports 20 may be anchored at the bottom of a canal.

In an alternative embodiment, the track may be supported from above. For example, the track may be supported as shown in FIG. 1c, in which supports 20 are shown above the track 8. In this embodiment, the apparatus may be supported from a bridge or overhead truss structure. For example, the track may be supported from an overhead structure, such as a bridge or truss spanning the waterway.

Figure 1B:
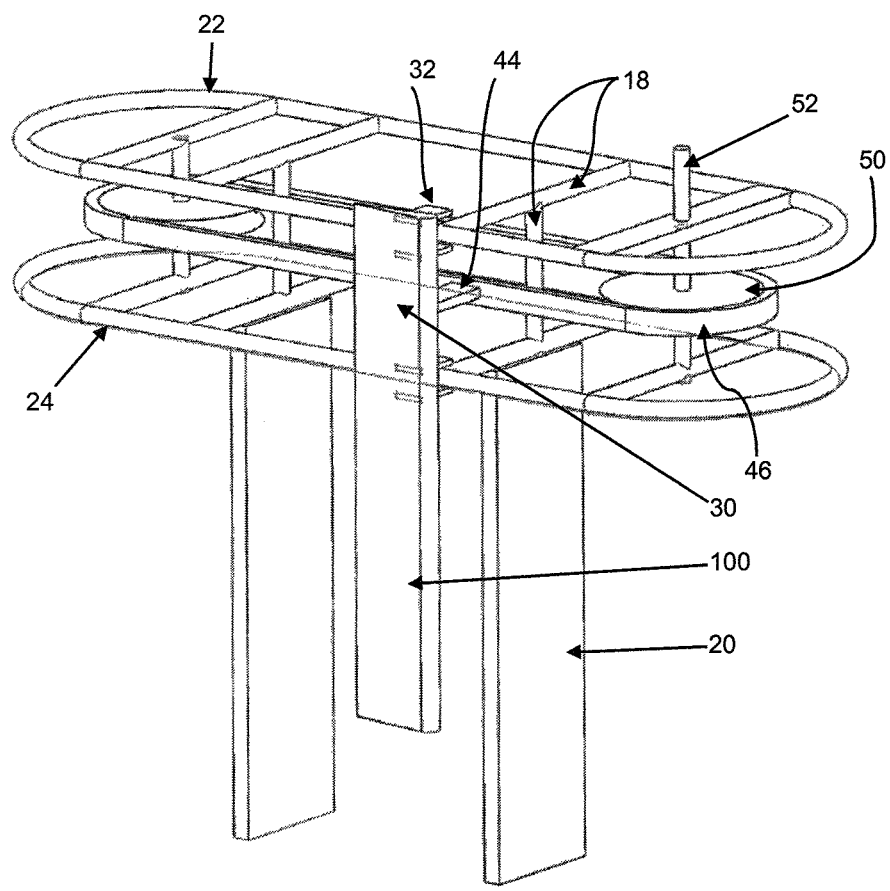
Figure 1C:
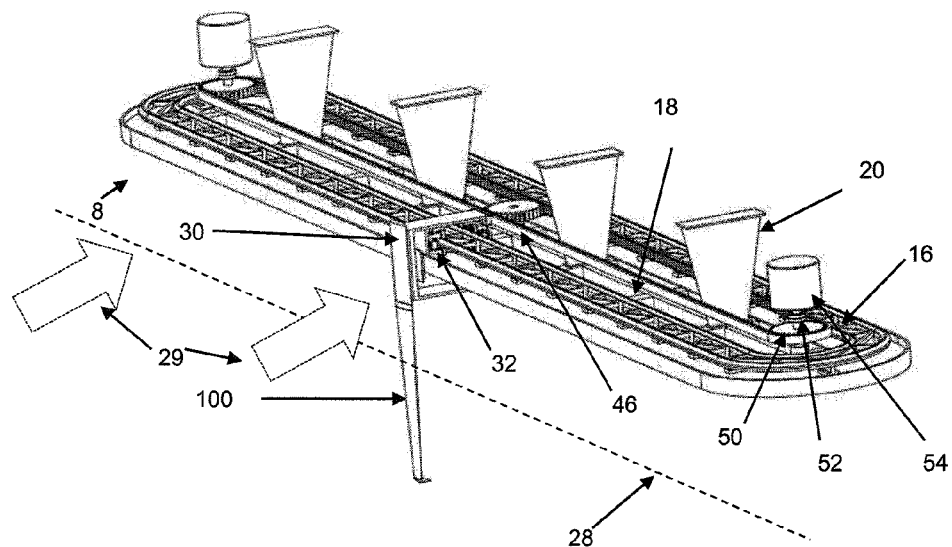

Another embodiment of a track configuration is shown in FIG. 1b, showing two mutually spaced parallel rails. As shown in FIG. 1b, there is an upper rail 22 and a lower rail 24 supported directly below the upper rail. Also shown in FIG. 1b are track supports 18, and apparatus supports 20. FIG. 1b includes an example of a blade assembly 30 supporting a blade 100 and rail system connectors 32. In practice, there will likely be a plurality of blade assemblies in this apparatus. FIG. 1b illustrates a motive power capture method involving a belt 46 connected to the blade assemblies 30 via connector 44 and pulleys 50 at each end of the track. As the blades are propelled on the track, the blade assemblies connected to the belt are moved, and the belt turns the pulleys. A shaft 52 at the center of at least one pulley is connected to a stationary generator 54 (not shown) that produces electricity. The pulleys that transmit the motive power from the belt to the generator shaft are also referred to herein as "bullwheels."

The power capture method illustrated in FIG. 1b employs a force transmitting means that may include a cable, belt, or chain connected to each blade assembly. The belt may be timing belt. In an embodiment, the blade assembly has a clamp that affixes the blade assembly to a cable, as shown by pointer 62 in FIG. 4. The force transmitting means moves in tandem with the blade assemblies. The force transmitting means drives a bullwheel that converts the motive power of the inventive apparatus into rotary power. Rotary power has a number of uses, such as turning the armature of an electricity generator to make electricity, or driving a water pump.

In modified embodiments of FIGS. 1b and 1c, showing rotary electric generators, there may be provided more than one generator. For example, there may be two generators, as shown in FIG. 1c. With two generators, for example, one can be switched off if electricity demand or water flow is insufficient. There can be provided additional generators through the use of additional bullwheels in the apparatus. For example, the embodiment shown in FIG. 1c has a third bullwheel at the center of the track that could be used to drive a generator.

As illustrated in FIG. 1b, the mutually spaced parallel rail track is oriented normal to the water flow and parallel to the surface of the waterway. In this illustrated embodiment, the blades are oriented vertically. In an alternative embodiment, the track can be in a vertical orientation, non-parallel to the surface of the waterway. In such an orientation, the blades would be oriented horizontally. Furthermore, in this alternative, the track would most likely be designed to be fully submerged.

FIG. 1c is an illustration of track variation similar to FIG. 1a, with two essentially coplanar concentric rails, and belt and bullwheel motive power capture apparatus, as in FIG. 1b. FIG. 1c also shows water line 28, in an example where the track apparatus is suspended (from above) above and outside the waterway. For example, the track may be suspended from a bridge over a river containing track 8. The motive power is provided from the movement of blade 100 on blade assembly 30 around the track. Blade assembly 30 is connected to belt 46, which turns bullwheel 50. Three bullwheels are illustrated in FIG. 1c. Bullwheel 50 drives shaft 52 which turns generator 54 to produce electricity.

The dashed line 28 in FIG. 1c shows an approximate water line if the track 8 was supported out of the water. The arrows marked 29 show the direction of the flow of water, normal to the linear segments of the track.

Figure 1D:
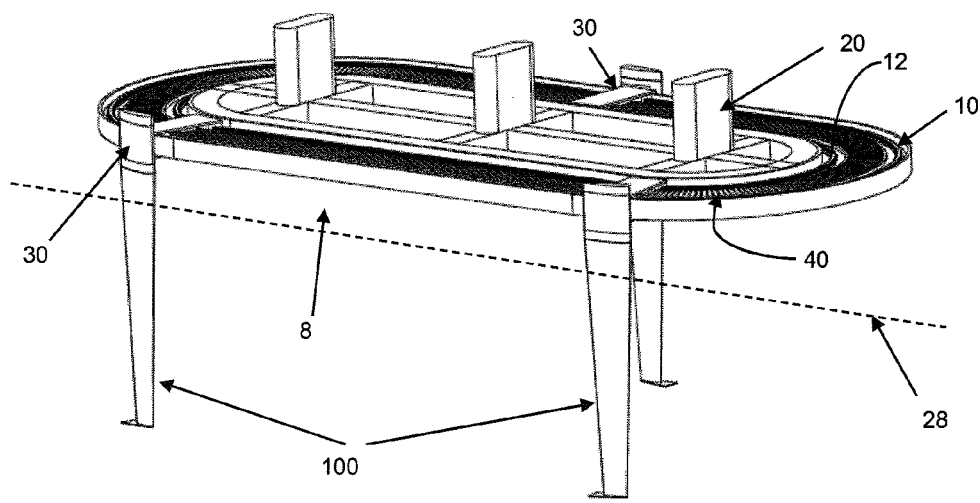

FIG. 1d is a track similar in configuration to FIG. 1a, but with a linear generator motive power embodiment, showing coils 40 (discussed below) interposed between the rail. Also shown are blade assemblies 30 having blades 100 affixed thereto.

Yet another track embodiment is a monorail (not shown). Industrial monorails are commercially available for machinery, for example, linear motion devices from THK (www.thk.com) provide a monorail and guide system.

In some embodiments, the track may be designed to be entirely submerged in the water flow. Alternatively, the track may be designed to be supported above the water flow, with blades configured that extend from the track into the water.

Figure 2A:
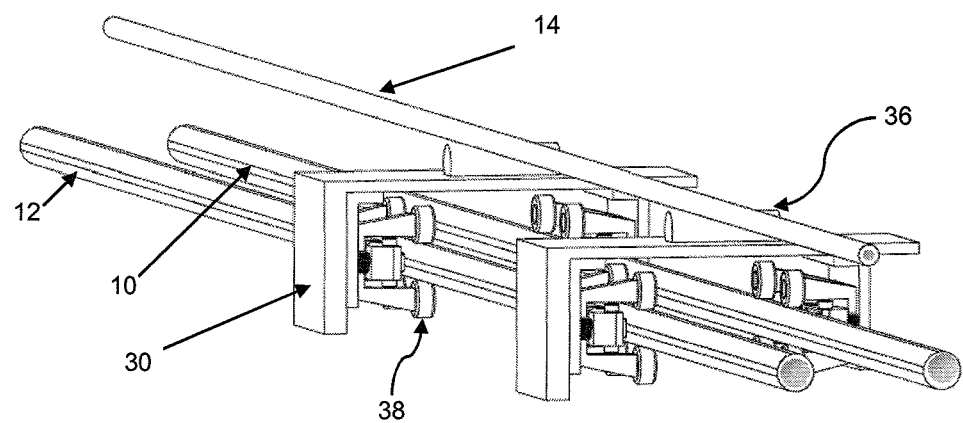
FIGS. 2a and 2b show rail system connection details of the same apparatus, in perspective in FIG. 2a and in cross section in FIG. 2b.
Figure 2B:
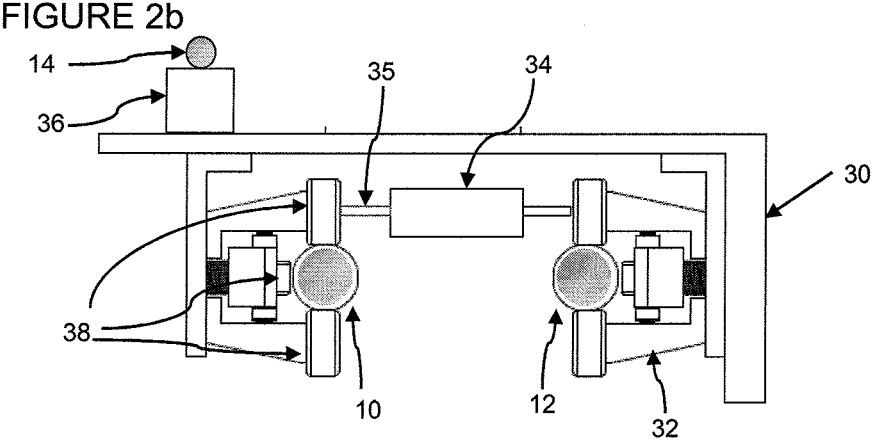
Figure 3:
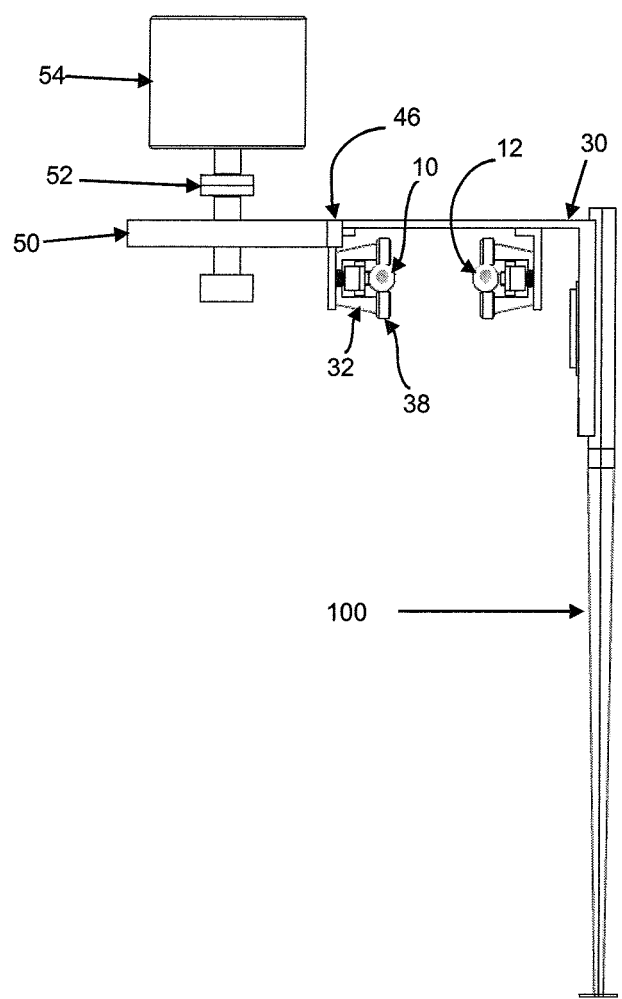
FIG. 3. shows a blade assembly detail in an elevational view, illustrating bullwheel and stationary rotary generator.
Figure 4:
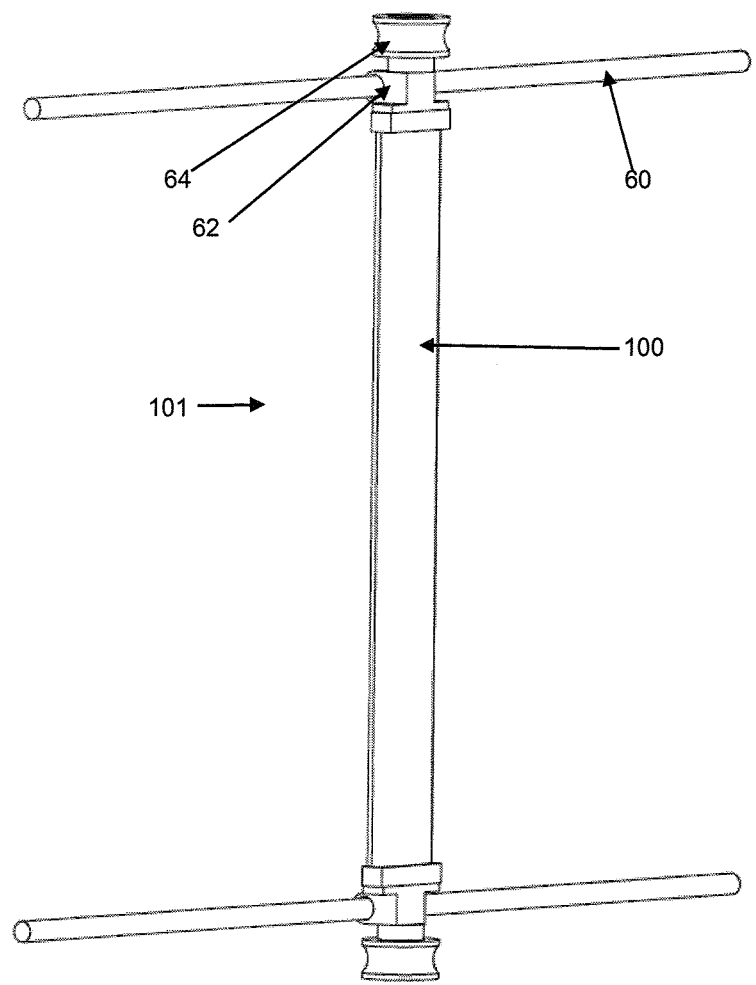
FIG. 4. illustrates a perspective of a track embodiment with two concentric rails that are mutually spaced and parallel to two additional concentric rails.

The blade assemblies of this invention require a suitable rail system connection to maintain the assembly on the track, and also support at least one airfoil blade. Representative examples of blade assemblies are shown in FIGS. 2-4. In an embodiment, as shown in FIG. 2, a blade assembly that might be used with the track embodiment depicted in FIG. 1a is shown. FIGS. 2a and 2b illustrate the same apparatus, where FIG. 2a is a perspective view, and FIG. 2b is a cross-sectional view. This embodiment illustrates a blade assembly body 30 and rail system connections 32 that interact with rails 10 and 12. Blade assembly body 30 will also support blade 100 (omitted in FIG. 2 for brevity). The rail system connections 32, an integral part of blade assembly 30, are shown with rollers 38 (three sets) interacting with the rails that will keep the blade assembly securely affixed to the rails, yet allow it to roll freely along the rails. Also shown in FIG. 2 is a motive power embodiment in which each blade assembly carries an electrical generator 34 (omitted for brevity in FIG. 2a), which is driven by one set of guide wheels 38 in mechanism 32 via shaft 35. The electric power so produced is conveyed off the blade assembly by electrode 36 on to electric conductive rail 14. The conductive rail 14 as shown is not load-bearing. The conductive rail in turn must be in electrical communication with power consuming devices. In practice, this may include any device with an electrical load, and may include voltage and AC regulators.

The blade assemblies in this invention support at least one airfoil blade. In various embodiments, a blade assembly may have two or more blades.

Another blade assembly embodiment is shown in FIG. 3. FIG. 3 is an elevation view of the guide assemblies showing a similar embodiment to that in FIG. 2, with rail system connections containing three sets of rollers to maintain the blade assembly securely on the track, yet allowing it to roll freely. In the embodiment shown in FIG. 3, the motive power capture method involves a belt 46 (also shown in perspective in FIGS. 1b and 1c) connected to blade assembly 30. Thus, as the action of the water on the airfoil blades produces net tangential lift and propels the blade along the track, the blade assembly forces the belt to move and turn the pulleys or bullwheels 50. The bullwheel shaft 52 may be connected to electrical generator 54 to produce electricity, as illustrated in FIG. 1c. Alternatively, the bullwheel shaft can be used to drive a water pump or some other rotary powered device.

In other embodiments of a rail system connection, there is at least one wheel, pulley, or bearing adapted to roll on a rail of the track and maintaining the blade assembly securely on the track. For example, as shown in FIGS. 2 and 3, a set of roller wheels connects the blade assembly to the track. As illustrated in FIGS. 2 and 3, least two wheels, pulleys, or bearings, are adapted to roll in different axes on the track. The rail system connection is not limited to wheels, pulleys, or bearings, and may include a sliding means for connecting the blade assembly securely to the track. For example, in an alternative embodiment, the blade assemblies may be equipped with skids that slide on the track. Two skids may be adapted to slide on different axes on the track to securely maintain the blade assembly on the track.

Figure 5:
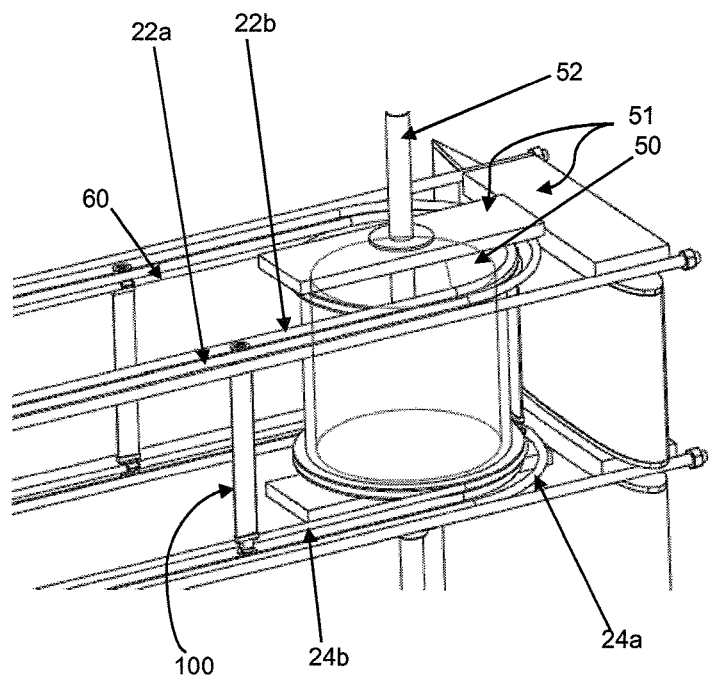
FIG. 5. shows the blade assembly of the embodiment represented in FIG. 4.

Another track and blade assembly embodiment is shown in FIGS. 4 and 5. In this embodiment, the track shown in FIG. 5 comprises two sets of parallel rails, with a first set of two concentric rails 22a and 22b mutually spaced and parallel to a second set of two additional concentric rails 24a and 24b. The second set of rails 24 is located directly below the first set or rails 22. Each pulley-like roller 64 on blade assembly 101 shown in FIG. 4 is interposed between the concentric rails, e.g. 22a and 22b (not shown in FIG. 4) at the top and bottom of the blade assembly 101. Also shown is cable 60, connected to blade assembly 101 by cable clamp 62. As the blades 100 are propelled around the track and pulleys, the blade assemblies force the cable to move in tandem. The cable drives bullwheel 50, which, in turn, drives shaft 52 which might turn the armature of a generator (not shown). Support brackets 51 support the bullwheel apparatus.

Although FIG. 5 shows the track apparatus in a horizontal orientation, in another embodiment, the track could be in a vertical orientation.

As discussed above, several methods for producing electrical power from the movement of the blades in the water are possible with this invention. In one embodiment, shown in FIG. 2, each blade assembly carries an electrical generator that is turned by the motion of the blade assembly on the track. Another embodiment (FIGS. 1b, 1c, 3, 4, and 5) is a cable, belt, or chain driven by the motion of the blades, that turns a bullwheel pulley that turns a generator. Yet another embodiment is a linear generator (FIG. 1d), in which coils between the rails on the track generate electricity from the movement of a permanent magnet affixed to each blade assembly.

In a linear generator embodiment, each blade assembly may have a permanent magnet affixed thereto, and the track may contain a series of coils (40 in FIG. 1d), such that the motion of the magnets in the blade assemblies over induction coils produces electricity. The induction generator coils are arranged on the track and connected together via a solid state switch (not shown) to a common bulbar (not shown) to enable extraction of electric power. Each coil may have a solid state switch (not shown) that can be activated via a proximity sensor (not shown) (non limiting examples include Hall Effect Switches, Magnetic Reed Switches and Optical transistors such as LDRs, and the like). In an alternative embodiment, the track may have a series of permanent magnets along its length, and the blade assemblies carry coils and a method for conveying power off the apparatus, such as an electric conductive rail, such as 14 in FIG. 2a or 2b.

The blade assemblies may carry either permanent magnets (movable magnet design) or Iron Cored Electromagnets (on-carriage power generation design) or iron armatures. Individual electromagnet assemblies or Electromagnet assemblies interspaced by Permanent Magnets are mounted opposite to these and are stationary. Moreover, all coils are not necessarily identical, and their design can be optimized, depending upon their physical location on the track. A set of these coils may be switched into an effective electric path (circuit) by any suitable and readily available solid state switching device. Examples include, but are not limited to Thyristors, Transistors, or Solid State Relays.

In the embodiment above, when the power generation is on the blade, the movement of blades can be independent of each other, or they can be moving in groups. In an embodiment, a plurality of blade assemblies are not operatively connected to each other, and each blade assembly can move independently of any other blade assembly, wherein the position of each blade assembly can be controlled by means of a linear power generator and associated electronic controls.

An advantage of a cable and bullwheel embodiment is that the track can be submerged in the water flow with the cable and bullwheel, which would be more difficult with the generator on each blade assembly or linear generator embodiments. The cable part of this invention can have alternative embodiments such as a belt or chain.

In a motive power embodiment of this invention, the mechanical power of the blades moving around the track is used to pump water rather than produce electricity. For example, a shaft 52 may drive an impeller water pump rather than an electrical generator. This embodiment may be very useful for an irrigation system in remote areas, where it would be desirable to pump water uphill, and an electrical system is not practical. In another embodiment, water could be pumped to a pond or lake at a higher elevation during periods of low external energy demand, and the water stored at the higher elevation lake or pond can be released when energy demand is higher.

An important aspect that distinguishes this invention from prior art devices with a similar gross configuration is that the blades of the inventive HKECS apparatus generate lift which substantially increases their efficiency. This is the aero(hydro)dynamic property as the moving blade interacts with the water of the motion of the fluid over the blade such that the lift component exceeds the drag component. By contrast, most prior art water power capture devices are drag devices. For example, traditional waterwheels, or the apparatus disclosed in U.S. Pat. No. 7,075,191 (in the water embodiment), are only drag devices.

An important aspect of a lift device is that the blade speed will be faster than the water current velocity, by at least a factor of 1.5 and possibly as much as a factor of 8. Preferably, the blade velocity will be 2-6 times faster than the water current velocity. By contrast, in a drag-propelled device, the blade velocity will be slower than the water current velocity. The ratio of blade speed to water speed can be expressed by $$\lambda = U/V$$

where U is the blade speed or velocity, and V is the water flow speed or velocity. Thus, the $\lambda$ factor of this invention ranges from about 1.5 to about 8.0, and preferably from about 2.0 to about 6.0. Lower $\lambda$ factors (less than 2) will cause reduced efficiency, due to ineffective design or high angles of attack. Higher $\lambda$ factors are limited by the cut-off speed of the airfoil blades, determined by the mechanical limits on the apparatus, such as a maximum safe operating speed and lower efficiency due to very low angles of attack.

In order for the blades on the inventive device to produce net lift, the blades must have an appropriate wing-like shape, airfoil cross-section, and pitch angle (angle of attack). In general, an airfoil blade has a chord, an upper and lower camber, and leading and trailing edges. An airfoil has a two dimensional cross-section of generally streamlined shape but with precise geometry specified up to coordinates, slopes, curvatures and the rate of change of curvature. For instance, NACAxxxx airfoils are approximated by a fifth order curve and a leading edge radius. In practice, standard airfoil shapes may need modification for improved performance in water. An appropriately designed airfoil moving through a fluid medium, such as air or water, produces an aerodynamic force in which the lift component normal to the direction of the relative fluid motions is substantially larger than the drag component. In this invention, this aerodynamic force propels the blades on the track at a greater velocity than the fluid velocity.

In some embodiments, the blades may be equipped with end plates or winglets that improve the aerodynamic characteristics (net lift) of the blades in the water. This is illustrated by 104 in FIGS. 1c and 1d.

The airfoil blades in the apparatus of the present invention move essentially on a linear path normal to flow of water. Thus, the blades may have a symmetric airfoil shape, to produce lift on both legs of an oval closed loop track, where the blades will move in opposite directions against the same current flow. In some embodiments, the blades may have a uniform airfoil cross-section and chord for the entire length of the blade. In other embodiments, the chord and cross-section may vary over the length of the blade.

The ratio of the length of the blade to the chord is the aspect ratio. In general, there are aerodynamic advantages to the use of larger aspect ratios, because a wing with a larger aspect ratio has lower induced drag. In an embodiment, the blades of the inventive HKECS apparatus carry plates of suitable size and shape at the tips (called end plates, shrouds or winglets) to obviate the induced drag.

An additional aerodynamic feature of this invention is the solidity factor based on the number of blades used on a track. Solidity is a non-dimensional factor given by $$\sigma = (N \cdot C)/R$$

where solidity is $\sigma$, N is the number of blades, C is the blade chord, and R is the radius of orbit for circular giromills or $$\sigma = (N \cdot C)/L$$

for a straight path L. Blade chord C should be chosen for a given airfoil such that
Reynolds number Re $$Re = (V \cdot C)/v$$

where V is the mean fluid velocity relative to the blade, C is the chord, and v is kinematic viscosity, is at least one million. The length of the blade will be as large as structurally feasible, having a shape with tapered chord and end plates optimizing hydrodynamic efficiency.

Power production efficiency $C_p$ is a function of σ and λ, so that for any given λ, there is an optimal σ that maximizes the energy conversion into mechanical form. This calculation can be used to optimize the number of blades for a given current velocity and water channel width.

A further advantage to the inventive designs, as opposed to prior art HAWT water turbine designs, is that the airfoil blades have consistent surface areas exposed at any given water depth. This can be important, because of differences in water current velocity at various depths. It is known from fluid dynamics that water current will be slower closer to the walls of a water channel, including the banks and river bottom of a river. The water current is fastest at the center of a water channel just below the surface. In a river or canal, the water current will be therefore be fastest, and the most kinetic energy will be available, in the center of the channel. The inventive device is better able to capture this faster water flow than an HAWT-based turbine design.

An additional feature that may be employed in this invention is the use of a starter apparatus capable of initiating the motion of the blades on the track, because in some embodiments, the start-up water current velocity will be higher than a normal operational water current velocity. Put differently, the blades may not begin moving (operating in lift mode) without initial acceleration to start moving. This problem can be addressed, for example, by the use of a Savonius rotor or helical giro-mill in conjunction with this apparatus to initiate the motion of blades on the track. A Savonius rotor or helical giro-mill can be selected with a low start-up speed and an overriding clutch. If there is sufficient water flow after motion of the blades is initiated, the blades will continue to move on the track as long as the water current velocity remains above the cut-in speed. The cut-in speed is the water current velocity below which the blades of the apparatus no longer have a net tangential lift and stop moving on the track.

Alternatively, a startup apparatus may consist of a small battery driven motor, connected to a belt or cable, which can be used to initiate motion of the blades in a lift mode. In another alternative, with a rotary or linear generator, a battery can be used to power the generator to act as a motor to start the apparatus. The battery can be recharged by the normal electrical generation action.

The invention claimed is:

1. A linear hydrokinetic energy conversion apparatus, comprising:
   a) an essentially non-circular closed-loop track comprising a substantially linear segment situated normal to the direction of a water flow in a waterway, wherein the track comprises at least one rail;
   b) at least one blade assembly adapted to move on the entire length of the track, where said at least one blade assembly comprises at least one rail system connection adapted to securely connect the at least one blade assembly to the track, and at least one airfoil blade, where a portion of the at least one airfoil blade is at least partially submerged in the water flow and adapted to move linearly in response to the water flow;
   c) the at least one airfoil blade having an airfoil cross sectional contour and pitch angle such that the force from the difference of tangential components of lift and drag acting on the airfoil is in the direction of motion of the at least one airfoil blade, where the lift component is greater than the drag component, resulting in the force propelling the at least one blade assembly along the track in response to the flow of water in the waterway; and
   d) power production means operatively associated with the force of the motion of said at least one airfoil blade on the track, wherein the power produced is selected from rotary power and production of electricity.

2. The apparatus of claim 1, wherein the track circumscribes an essentially oval path with a linear segment normal to the direction of the water current.

3. The apparatus of claim 1, wherein the track circumscribes an essentially oval path with a first linear segment normal to the direction of the water current on a leading segment of the track, and a second linear segment perpendicular to the water flow on a trailing segment of the track.

4. The apparatus of claim 1, wherein the track shape has an expanded radius shape at at least one end.

5. The apparatus of claim 1, wherein the track is selectively supported from below or above.

6. The apparatus of claim 1, wherein the track is not submerged in the waterway, and the at least one airfoil blade is adapted to be sufficiently submerged in the waterway to power the apparatus.

7. The apparatus of claim 1, wherein a linear segment of the track is oriented normal to the water flow and parallel to the surface of the waterway.

8. The apparatus of claim 1, wherein a linear segment of the track is oriented normal to the water flow and nonparallel to the surface of the waterway.

9. The apparatus of claim 1, wherein the track comprises a single load-bearing rail.

10. The apparatus of claim 9, wherein the single rail is configured so any blade assembly banks at the corners.

11. The apparatus of claim 1, wherein the track comprises two or more load-bearing rails.

12. The apparatus of claim 11, wherein the track comprises four load-bearing rails.

13. The apparatus of claim 11, wherein the track comprises at least two concentric rails on approximately the same horizontal plane.

14. The apparatus of claim 13, further comprising a bank in the track at corners of the track.

15. The apparatus of claim 11, wherein the track comprises at least two mutually spaced parallel rails, wherein a first rail system connection is connected to at least one rail and a second rail system connection is connected to a second parallel rail.

16. The apparatus of claim 15, comprising a first set of two concentric rails mutually spaced and parallel to a second set of two concentric rails.

17. The apparatus of claim 1, wherein the power producing means comprises a rotary powered device selected from a rotary electrical generator and a water pump, operatively associated with the motion of said at least one airfoil blade on the track.

18. The apparatus of claim 17, wherein the electrical power generating means comprises:
   a) a linear force transmitting means selected from a cable, belt, and chain, wherein the force transmitting means is connected to the at least one blade assembly, wherein sufficient pulleys support and guide the force transmitting means; and b) at least one bullwheel driven by the force transmitting means, wherein the shaft of the bullwheel drives a rotary electrical generator.

19. The apparatus of claim 18, wherein the track, the at least one blade assembly, the at least one blade, and the electrical generator are all submerged in the water flow.

20. The apparatus of claim 1, wherein the power producing means comprises:

a) an electrical generator mounted on each blade assembly wherein the generator is driven by a shaft adapted to rotate in response to the motion of the assembly on the track;

b) an electric conducting rail on the track, and an electrode on each blade assembly in electrical contact with the electric conducting rail; and c) an electrical cable connected to the electric conducting rail for conducting electricity to an electrical load.

21. The apparatus of claim 20, wherein the electric conducting rail is an additional non-load-bearing rail.

22. The apparatus of claim 1, wherein the power producing means comprises a linear power generator wherein each blade assembly has a permanent magnet mounted thereon and the track further comprises a series of electric coils, wherein the movement of the magnet on the blade assembly produces electrical power connected to an electrical load.

23. The apparatus of claim 1, wherein the power producing means comprises a linear power generator wherein each blade assembly has a coil mounted thereon and the track further comprises a series of permanent magnets, wherein the lift-propelled movement of the coil on the blade assembly produces electrical power connected to an electrical load.

24. The apparatus of claim 1, comprising a plurality of blade assemblies.

25. The apparatus of claim 1, wherein each blade assembly comprises two or more blades.

26. The apparatus of claim 1, comprising a plurality of blade assemblies wherein the plurality of blade assemblies are not operatively connected to each other, and each blade assembly can move independently of any other blade assembly, wherein the position of each blade assembly can be controlled by means of a linear power generator and associated electronic controls.

27. The apparatus of claim 1, wherein the rail system connection has at least one wheel, pulley, or bearing, adapted to roll on a rail of the track and connecting the at least one blade assembly securely on the track.

28. The apparatus of claim 27, wherein the rail system connection has at least two wheels, pulleys, or bearings, adapted to roll in different axes on the track.

29. The apparatus of claim 1, wherein the rail system connection slides on the track.

30. The apparatus of claim 29, wherein the rail system connection has at least two skids adapted to slide on different axes on the track.

31. The apparatus of claim 1, wherein the at least one airfoil blade is in a vertical orientation, and the bottom portion of the at least one airfoil blade is at least partially submerged in the water flow.

32. The apparatus of claim 31, wherein each airfoil blade is fully submerged in the waterway.

33. The apparatus of claim 1, wherein the at least one airfoil blade is in a horizontal orientation, and the track in vertical orientation and the track is fully submerged in the water flow.

34. The apparatus of claim 1, wherein each airfoil blade has a structure selected from an endplate and a winglet, adapted to increase the lift of the blade in water.

35. The apparatus of claim 1, wherein the airfoil cross-section of the at least one airfoil blade is symmetric along the entire length of the blade.

36. The apparatus of claim 1, wherein the at least one airfoil blade has the same chord and cross-section for the entire length of the blade.

37. The apparatus of claim 1, wherein the at least one airfoil blades has a chord and cross-section of the at least one airfoil blade varies along a long axis over the length of the at least one airfoil blade.

38. The apparatus of claim 1, wherein a ratio X, of blade velocity to velocity of the current in the water flow, is calculated by the equation:

$\lambda = U/V$ where U is the linear velocity of a blade on the track, and V is the velocity of the water current in the water flow, and wherein the range of $\lambda$ is between about 1.5 to about 8.0.

39. The apparatus of claim 38 wherein $\lambda$ is between about 1.8 to about 6.0.

40. The apparatus of claim 38 wherein $\lambda$ is between about 2.0 to about 5.0.

41. The apparatus of claim 38 wherein $\lambda$ is between about 2.0 to 3.0.

42. The apparatus of claim 38 wherein $\lambda$ is about 4.0.

43. The apparatus of claim 38 wherein $\lambda$ is about 6.0.

44. A linear hydrokinetic energy conversion apparatus, comprising:

an essentially non-circular closed-loop track comprising a substantially linear segment situated normal to the direction of a water flow in a waterway, wherein the track comprises at least two mutually spaced parallel rails;

at least one blade assembly adapted to move on the entire length of the track, where said at least one blade assembly comprises at least one airfoil blade, where a portion of the at least one airfoil blade is at least partially submerged in the water flow and adapted to move linearly in response to the water flow, and the at least one blade assembly further comprises at least two rail system connections, wherein a first rail system connection is connected to at least one rail and a second rail system connection is connected to a second parallel rail, the at least one airfoil blade having a airfoil cross sectional contour and pitch angle such that the force from the difference of tangential components of lift and drag acting on the airfoil of the at least one airfoil blade is in the direction of motion of the at least one airfoil blade, and propels said at least one blade assembly along the track in response to the flow of water in the waterway; and rotary power producing means operatively associated with the force of motion of said at least one blade on the track, comprising a linear force transmitting means selected from a cable, belt, and chain, wherein the force transmitting means is connected to the at least one blade assembly; and at least one bullwheel driven by the force transmitting means, wherein the shaft of the bullwheel drives a rotary powered device selected from an electrical generator and a water pump, wherein a chord and cross-section of the at least one airfoil blade varies along a long axis of the at least one airfoil blade.

45. A process for producing power, comprising:

an essentially non-circular closed-loop track comprising a substantially linear segment situated normal to the direction of a water flow in a waterway, wherein the track comprises at least one rail;

at least one blade assembly adapted to move on the entire length of the track, where said at least one blade assembly comprises at least one rail system connection adapted to securely connect the at least one blade assembly to the track, and at least one airfoil blade, where a portion of the at least one airfoil blade is at least partially submerged in the water flow and adapted to move linearly in response to the water flow;

the at least one airfoil blade having an airfoil cross sectional contour and pitch angle such that the force from the difference of tangential components of lift and drag acting on the airfoil is in the direction of motion of the at least one airfoil blade, where the lift component is greater than the drag component, resulting in the force propelling the at least one blade assembly along the track in response to the flow of water in the waterway; and power production means operatively associated with the force of the motion of said at least one airfoil blade on the track, wherein the power produced is selected from rotary power and production of electricity.

46. The process of claim 45, wherein the power produced is rotary power that drives a device selected from an electrical generator and a water pump.

47. A linear hydrokinetic energy conversion apparatus, comprising:

a) an essentially non-circular closed-loop track comprising a substantially linear segment situated normal to the direction of a water flow in a waterway, wherein the track comprises at least one rail;

b) at least one blade assembly adapted to move on the entire length of the track, where said at least one blade assembly comprises at least one rail system connection adapted to securely connect the at least one blade assembly to the track, and at least one airfoil blade, a chord and cross-section of the at least one airfoil blade varying along a long axis of the at least one airfoil blade, where a portion of the at least one airfoil blade is at least partially submerged in the water flow and adapted to move linearly in response to the water flow;

c) the at least one airfoil blade having an airfoil cross sectional contour and pitch angle such that the force from the difference of tangential components of lift and drag acting on the airfoil is in the direction of motion of the at least one airfoil blade, where the lift component is greater than the drag component, resulting in the force propelling the at least one blade assembly along the track in response to the flow of water in the waterway; and d) power production means operatively associated with the force of the motion of said at least one airfoil blade on the track, wherein the power produced is selected from rotary power and production of electricity.

* * * * *